United States Patent
Chen (10) Patent No.: US 6,400,510 B1
(45) Date of Patent: Jun. 4, 2002

(54) UNIFORM ILLUMINATION OPTICAL DEVICE WITH A CONCAVE LENS

(75) Inventor: Hao-Chih Chen, Tai-Chung Hsien (TW)

(73) Assignee: Acer Communications and Multimedia Inc., Taoyuan (TW)

( * ) Notice: Subject to any disclaimer, the term of this patent is extended or adjusted under 35 U.S.C. 154(b) by 0 days.

(21) Appl. No.: 09/682,396

(22) Filed: Aug. 30, 2001

(30) Foreign Application Priority Data

Sep. 1, 2000 (TW) ......................................... 089117915

(51) Int. Cl.[7] ............................................. G02B 27/10
(52) U.S. Cl. ........................ 359/626; 359/621; 359/622; 359/623
(58) Field of Search ................................. 359/626, 621, 359/622, 623, 619, 625, 624, 456; 362/268, 328

(56) References Cited

U.S. PATENT DOCUMENTS 5,241,416 A * 8/1993 Mitsutake et al. .......... 359/456
5,786,939 A * 7/1998 Watanabe .................... 359/621
6,075,648 A * 6/2000 Yamamoto et al. .......... 359/619
6,246,526 B1 * 6/2001 Okuyama .................... 359/621
6,283,615 B1 * 9/2001 Takahashi .................... 362/328
6,330,112 B1 * 12/2001 Kaise et al. ................. 359/621

* cited by examiner

Primary Examiner—Georgia Epps
Assistant Examiner—Gary O'Neill
(74) Attorney, Agent, or Firm—Winston Hsu (57) ABSTRACT

A uniform illumination device satisfies the demands of having a short optic path, a smaller beam size, and desired parallel beams. The uniform illumination device has a beam splitting device for converting light from a light source into a plurality of parallel beams, and a beam condenser for condensing the parallel beams to form a more uniform condensed light. The beam condenser has a first condensing lens made of a convex lens, and a second condensing lens made of a concave lens. When the parallel beams transmitted from the beam splitting device pass through the first condensing lens of the beam condenser, the parallel beams converge to the central axis. When the parallel beams pass through the second condensing lens, the parallel beams converge towards axes that are parallel with the central axis. The parallel beams transmitted from the beam splitting device are mixed to form the more uniform condensed light.

18 Claims, 7 Drawing Sheets

UNIFORM ILLUMINATION OPTICAL DEVICE WITH A CONCAVE LENS

BACKGROUND OF INVENTION

1. Field of the Invention

The present invention relates to a uniform illumination optical device, and more particularly, to a uniform illumination optical device with a concave lens.

2. Description of the Prior Art

Figure 1:
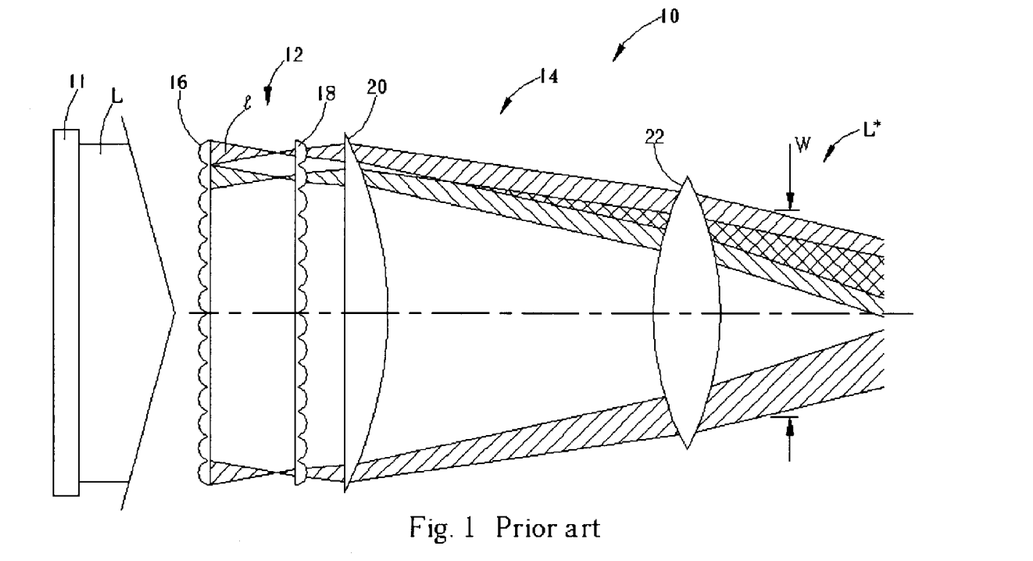
FIG. 1 is a diagram of a prior art uniform illumination optical device.

Please refer to FIG. 1, which is a diagram of a prior art uniform illumination optical device 10. The uniform illumination optical device 10, applied in a projection device, is used to provide a uniform illumination of light L produced from a light source 11. The uniform illumination optical device 10 comprises a beam splitting device 12 for converting the light L from the light source 11 into a plurality of parallel beams I, and a beam condenser 14 for condensing the parallel beams I to form a more uniform condensed light L* than the light from the light source 11.

As shown in FIG. 1, the beam splitting device 12 comprises a plurality of first dispersing lenses 16, and a plurality of second dispersing lenses 18 that correspond to the first dispersing lenses 16. The first dispersing lenses 16 are flat-convex lenses used for converting the transmitted light L from the light source 11 into the plurality of beams I. Similarly, the second dispersing lenses 18 are flat-concave lenses located outside a focus of the first dispersing lenses 16, and transmit the received beams I to the beam condenser 14.

The beam condenser 14 comprises a first condensing lens 20 and a second condensing lens 22. The first condensing lens 20 is a flat-concave lens located behind the second dispersing lenses 18 of the beam splitting device 12 for receiving the beams I transmitted from the beam splitting device 12. The second condensing lens 22 is a convex lens located behind the first condensing lens 20 for receiving the beams I transmitted from the first condensing lens 20. As shown in FIG. 1, the beams I gradually converge to form the condensed light L* after passing the first and second condensing lenses 20 and 22.

Generally speaking, the light L transmitted from the light source 11 is not uniform. Therefore, the beams I generated from the light L are also not uniform. Nevertheless, the beams I are condensed to form the condensed light L*. Overall, the condensed light L* is more uniform than the light L transmitted from the light source 11.

When designing a small-sized projection device, to improve the overall performance of the device, a designer strives to achieve a short optic path, a small beam size W, and light that is parallel. A shorter optic path leads to a smaller projection device. If the beam size W is small, the actual size of the lenses, dichroic mirrors, and polarization beam splitters are decreased, which reduces the overall size of the device and lowers costs as well. In addition, dichroic mirrors, reflective liquid crystal display panels, and transmissive liquid crystal display panels all generally have a fixed range of angles for incident light. If each incident beam is parallel, the beams will have a smaller incident angle within the limiting range of allowed incident angles.

Figure 2:
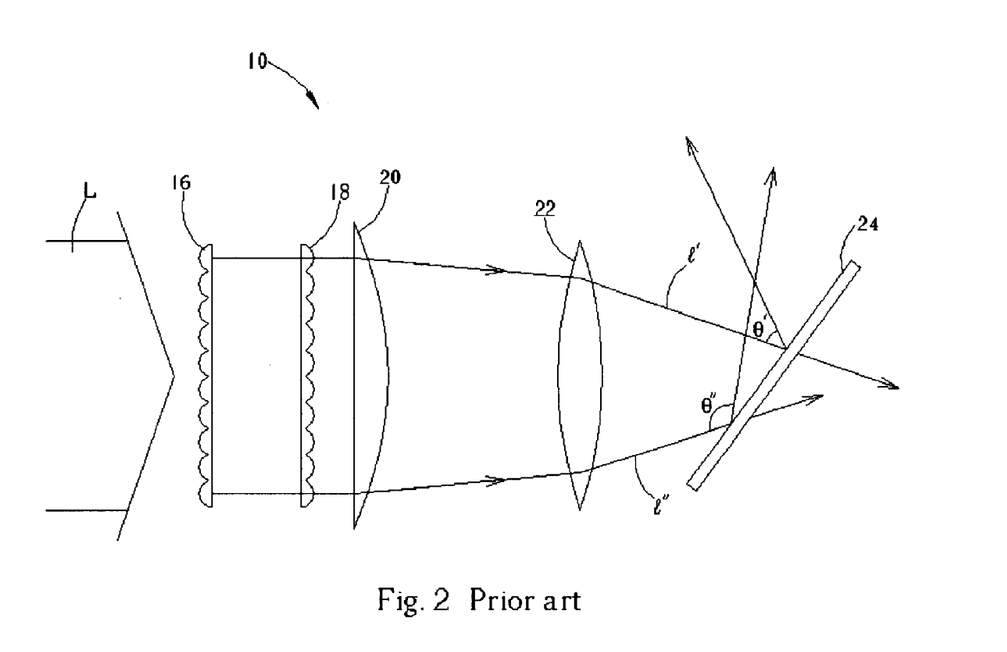
FIG. 2 is a diagram of an optic path of the uniform illumination device shown in FIG. 1 incident upon a dichroic mirror.

Please refer to FIG. 2, which is a diagram of an optic path for transmitted light from the uniform illumination device 10 incident upon a dichroic mirror 24. Two beams I', I'''' generated from the light L are taken as an example. If the two beams I', I'''' are not parallel, their corresponding incident angles θ', θ'''' will be different for the dichroic mirror 24. Because the dichroic mirror 24 has a limitation on the incident angle, incident angles θ', θ'''' exceeding this limitation influence the final display quality. Typically, a more expensive device, such as a coating dichroic mirror, is used to solve this problem.

Designing a short optic path, a smaller beam size, and parallel light beams according to the prior art uniform illumination device 10 is very difficult. As shown in FIG. 1, the second dispersing lens 18 is usually located behind the focus of the first dispersing lens 16, and is used to disperse the beams transmitted from the first dispersing lens 16. The optic path between the second dispersing lens 18 and the first dispersing lens 16, therefore, must be longer than the length of the focus of the first dispersing lens 16. Taking the second condensing lens 22 as an example, the curvature of the second condensing lens 22 must be large for a smaller beam size W. However, a larger curvature makes transmitted beams converge towards the optic center so that the transmitted beams are no longer parallel. The design of the prior art uniform illumination device 10 is thus incapable of simultaneously satisfying the demands for a short optic path, a smaller beam size, and parallel beams.

SUMMARY OF INVENTION

It is therefore a primary objective of the present invention to provide a uniform illumination device with a concave lens to solve the above-mentioned problem.

Briefly, the claimed invention provides a uniform illumination device comprising a beam splitting device for converting the light from the light source into a plurality of parallel beams, and a beam condenser for condensing the parallel beams to form a more uniform condensed light than the light from the light source. The beam condenser further comprises a first condensing lens made of a convex lens and a second condensing lens made of a concave lens. When the parallel beams transmitted from the beam splitting device pass through the first condensing lens of the beam condenser, the parallel beams converge to the central axis. On the other hand, when the parallel beams pass through the second condensing lens, the parallel beams converge with axes that are parallel with the central axis. In the end, the parallel beams transmitted from the beam splitting device through the first condensing lens and the second condensing lens mix to form the more uniform condensed light.

It is an advantage of the present invention that, with the concave lens, the uniform illumination device can satisfy the demands of having a short optic path, a smaller beam size, and the desired parallel beams.

These and other objectives of the present invention will no doubt become obvious to those of ordinary skill in the art after reading the following detailed description of the preferred embodiment, which is illustrated in the various figures and drawings.

DETAILED DESCRIPTION

Figure 3:
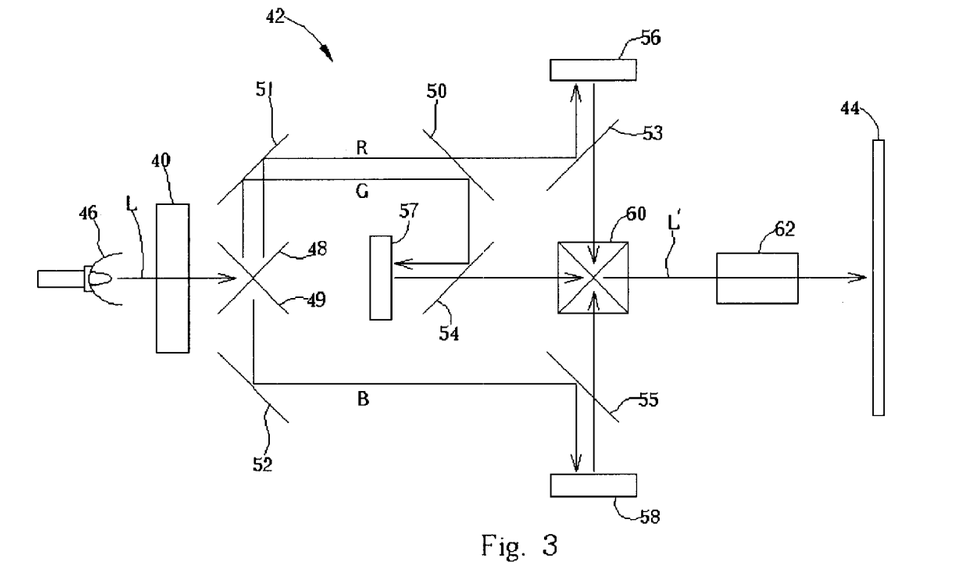
FIG. 3 is a diagram of a uniform illumination device according to the present invention as applied to a projection device.

Please refer to FIG. 3. FIG. 3 is a diagram of a uniform illumination device 40 according to the present invention as applied to a projection device 42. The projection device 42 modulates light L into a light L' to generate an image signal, and projects the corresponding image onto a screen 44. The projection device 42 comprises a light source 46 for generating the light L, three dichroic mirrors 48, 49, 50 for splitting the light L into respective red, green, and blue monochromatic beams R, G, B; two mirrors 51, 52 for reflecting three monochromatic beams R, G, B; three polarization beam splitters 53, 54, 55; three reflective liquid crystal display panels 56, 57, 58 containing half wave retarders for modulating the red, green, and blue monochromatic beams R, G, B; a color cube 60 for combining the red, green, and blue monochromatic beams R, G, B to form the light L', and a set of projection lenses 62 for projecting the light L' onto the screen 44. The uniform illumination device 40 according to the present invention provides a uniformly illuminating light source from the original light L so that the brightness of the image on the screen 44 is more uniform.

Figure 4:
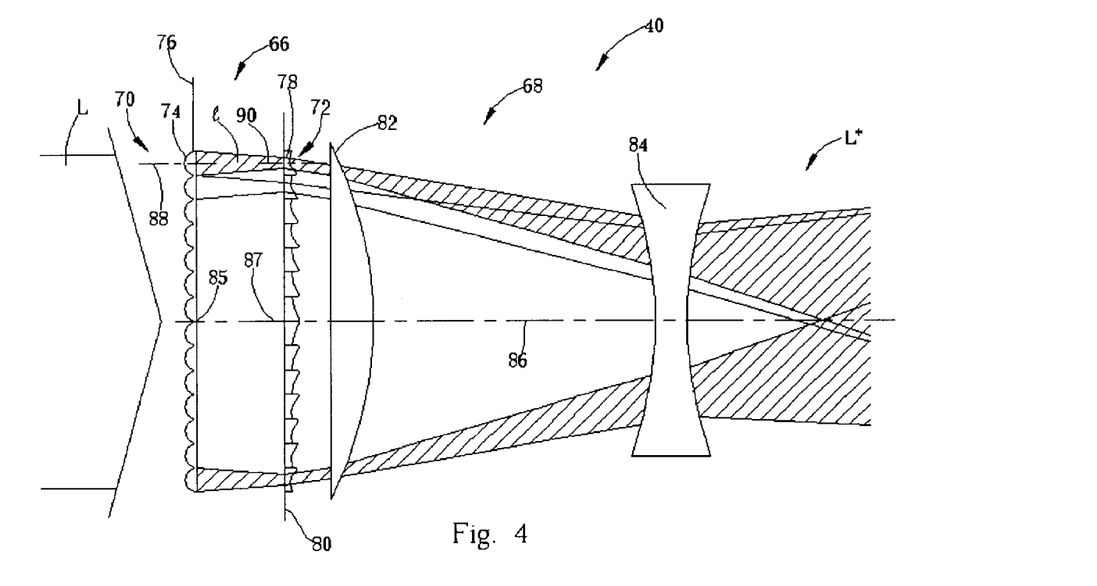
FIG. 4 is a diagram of a uniform illumination device according to the present invention.

Please refer to FIG. 4, which is a diagram of the uniform illumination device 40 according to the present invention. The uniform illumination device 40 comprises a beam splitting device 66 for converting the light L from the light source 46 into a plurality of parallel beams I, and a beam condenser 68 for condensing the parallel beams I to form a more uniform condensed light L* than the light L from the light source 46.

The beam splitting device 66 comprises a first lens set 70 and a second lens set 72. The first lens set 70 has a plurality of first dispersing lenses 74 arranged side by side to form a first flat panel 76 for receiving the light L from the light source 46. Similarly, the second lens set 72 has a plurality of second dispersing lenses 78 corresponding to the first dispersing lenses 74 arranged side by side to form a second flat panel 80. The first dispersing lenses 74 are flat-convex lenses, and the second dispersing lenses 78 are flat-concave lenses. The second flat panel 80 is parallel to the first flat panel 76, and the second dispersing lenses 78 are located inside a focus of the first dispersing lenses 74.

The beam condenser 68 comprises a first condensing lens 82 and a second condensing lens 84. The first condensing lens 82 is a convex lens located behind the second lens set 72 of the beam splitting device 66 for receiving the beams I transmitted from the beam splitting device 66. The second condensing lens 84 is a concave lens located behind the first condensing lens 82. The second condensing lens 84 is parallel to the first condensing lens 82, and is located inside a focus of the first condensing lens 82. An optic axis of the first condensing lens 82 coincides with an optic axis of the second condensing lens 84 to form a central axis 86. The central axis 86 is perpendicular to the first and second flat panels 76 and 80, and passes through centers 85, 87 of the first and second lens sets 70 and 72, respectively. The term optic axis is meant to indicate that line of travel along which light is not bent by a lens.

As shown in FIG. 4, when the light L from the light source 46 passes through the first lens set 70, each of the first dispersing lenses 74 converges the received light toward a respective optic axis 88 to form beams I. The first dispersing lenses 74, therefore, transform the light L from the light source 46 into a plurality of beams I. When the beams I pass through the second lens set 72, each of the second dispersing lenses 78 deviates the received beams I away from a respective optic axis 90.

When the beams I transmitted from the beam splitting device 66 pass through the first condensing lens 82 of the beam condenser 68, the beams I are deviated toward the central axis 86, mixing and dispersing with respect to each other. When the beams I pass through the second condensing lens 84, the beams I are deviated towards directions that are parallel with the central axis 86, and each of the beams I disperses and covers the whole area. After the beams I pass through the first and second condensing lenses 82 84, each of the beams I are combined together to form a more uniform condensed light L* than the original light L.

Figure 5:
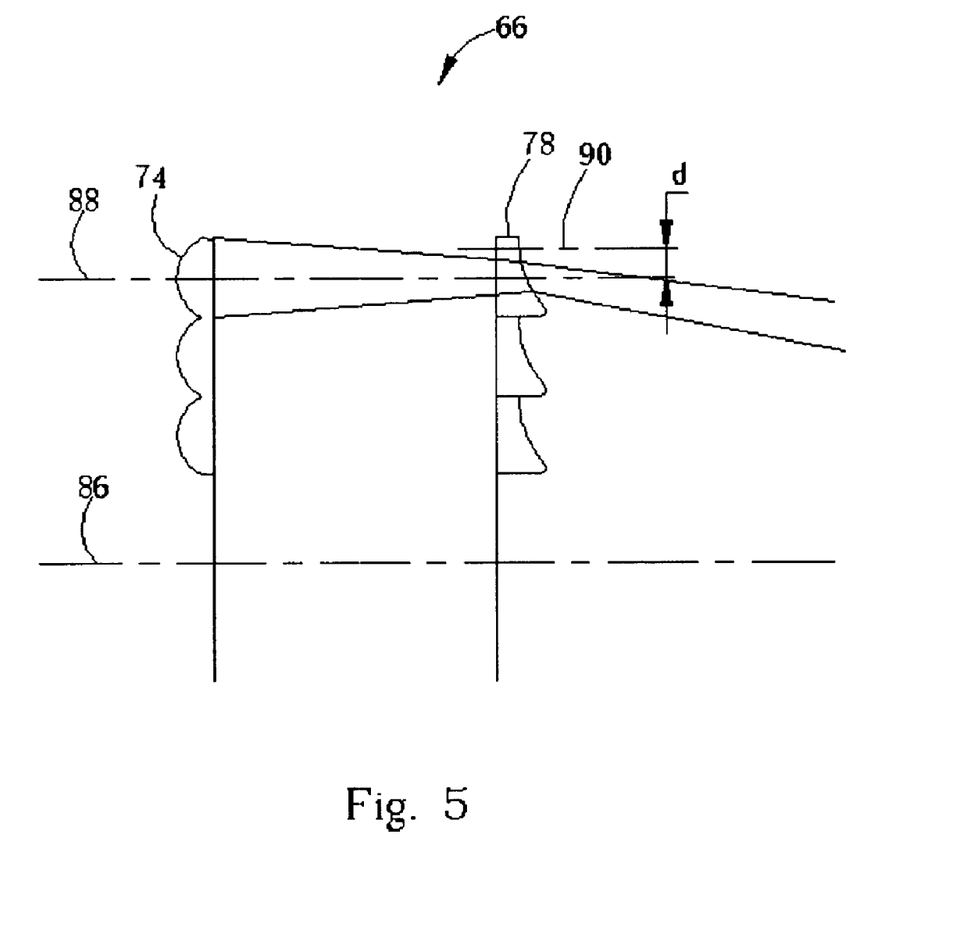
FIG. 5 is a diagram of first dispersing lenses and corresponding second dispersing lenses of a beam splitting device of the present invention.

Please refer to FIG. 5, which is a diagram of the first dispersing lenses 74 and the corresponding second dispersing lenses 78 of the beam splitting device 66. Each optic axis 90 of the second dispersing lenses 78 does not coincide with the optic axis 88 of the corresponding first dispersing lens 74. There is a displacement d between the optic axis 88 and optic axis 90. The main purpose of the displacement d is to help the first condensing lens 82 to converge the beams I, and is optional. That is, the uniform illumination device 40 according to the present invention will work without the displacement d. Each displacement d of the second dispersing lenses 78 changes according to the distance between the second dispersing lenses 78 and the central axis 86. The second dispersing lens 78 located near the central axis 86 require a smaller displacement d than those farther from the central axis 86.

Figure 6:
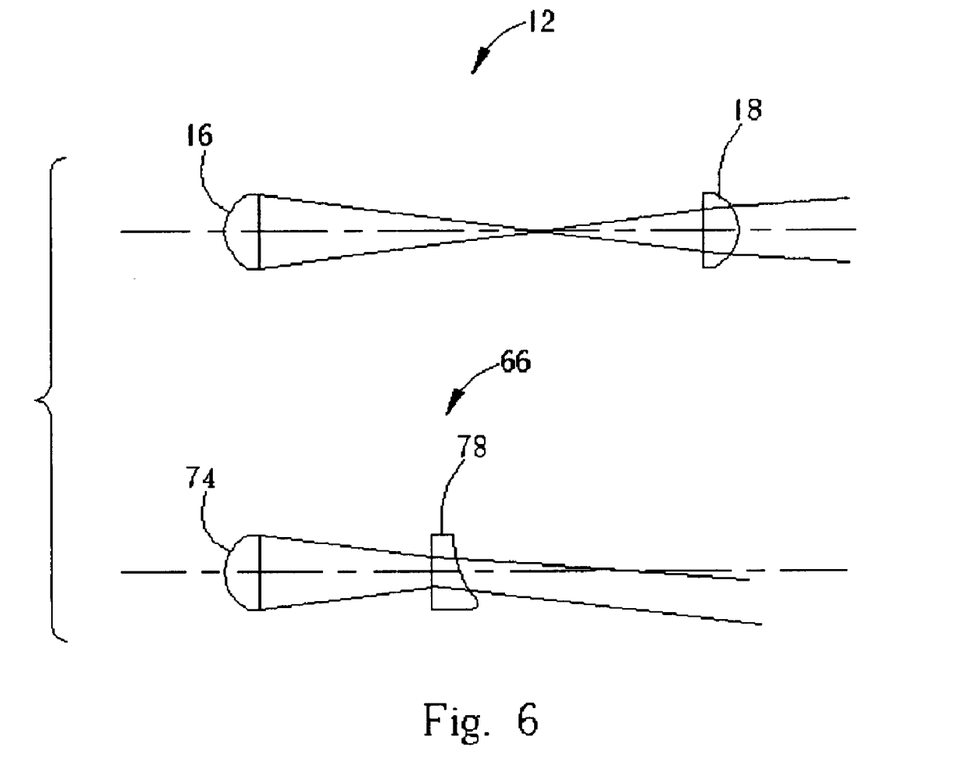
FIG. 6 is a diagram contrasting the beam splitting device shown in FIG. 4 with a prior art beam splitter.

Please refer to FIG. 6, which is a diagram of the beam splitting device 66 shown in FIG. 4 contrasted with the prior art beam splitter 12. Because the first and second dispersing lenses 16 and 18 of the prior art beam splitter 12 are convex lenses, the second dispersing lenses 18 need to be located behind the focus of the first dispersing lenses 16 to transmit the light with a moderate angle onto the screen. The distance between the prior art first and second dispersing lenses 16 and 18, therefore, cannot be shortened by any means. Assume that the focus of the first dispersing lenses 74 is equal to the focus of the first dispersing lenses 16. Because the second dispersing lenses 78 according to the present invention are concave lenses, the second dispersing lenses 78 are capable of being located inside the focus of the first dispersing lenses 74 while still transmitting the light with a moderate angle. Consequently, the optic path is shortened and the size of the device may be reduced.

Figure 7:
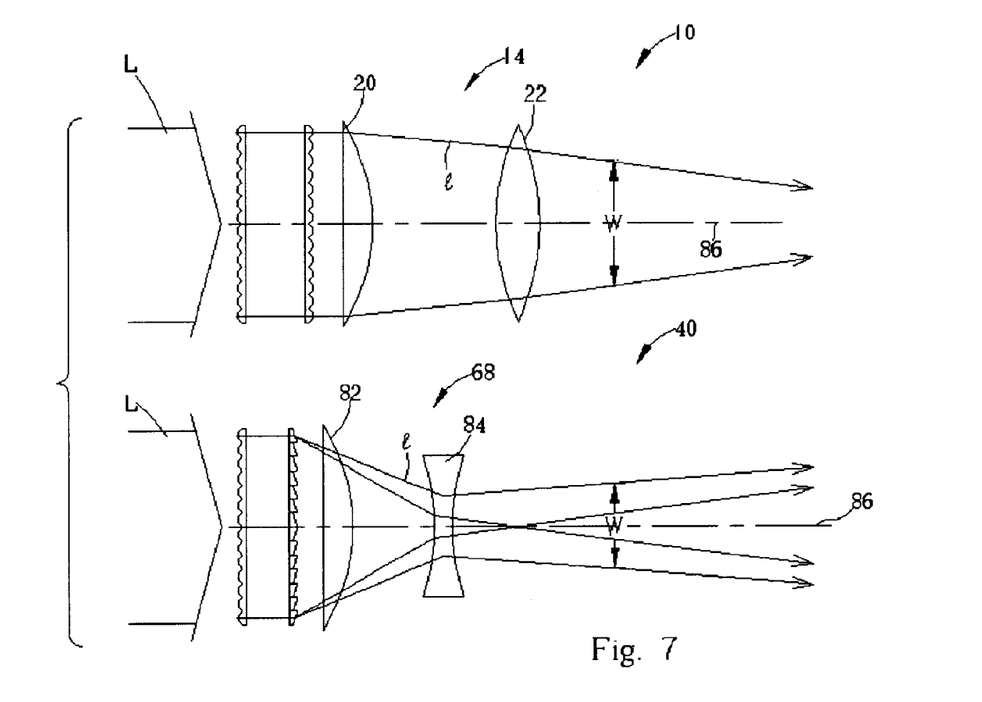
FIG. 7 is a diagram contrasting optic paths of a beam condenser according to the present invention with a prior art beam condenser.

Please refer to FIG. 7, which is a diagram of optic paths of the beam condenser 68 according to the present invention contrasted with those of the prior art beam condenser 14. Because the first and second condensing lenses 20 and 22 of the prior art beam condenser 14 are convex lenses, the beam size W of the condensed light L* cannot be shortened. According to the beam condenser 68 of the present invention uniform illumination device 40, the first condensing lens 82 is, however, a convex lens with a larger curvature to more quickly deviate the beams I towards the central axis 86, and the second condensing lens 84 is a concave lens for deviating the beams I towards directions in parallel with the central axis 86. Consequently, the beam size W is shortened and the size of the device may be reduced as well. Because the first condensing lens 82 converges the beams I toward the central axis 86 quickly, the distance between the first and second condensing lenses 82 and 84 can be shortened to further achieve the objective of a shorter optic path.

The projection device 42 further comprises a polarization converter positioned between the first and second lens sets 70 and 72, or between the second lens set 72 and the first condensing lens 82, for polarizing the beams I. Each of the final beams I thus has the same polarization. Some polarization converters further split the beams, and the number of beams transmitted to the second lens set 72 is doubled when such a polarization converter is positioned between the first lens set 70 and the second lens set 72. By adjusting the number of second dispersing lenses 78 and the corresponding locations of the second dispersing lenses 78, it is possible to continue to achieve the same objectives of the claimed uniform illumination device.

The preferred embodiment discussed above is shown in a projection device 42 that uses a reflective liquid crystal display method. The claimed uniform illumination device 40, however, may be applied in projection devices that use a transmissive liquid crystal display method, or in other types of projection devices, such as projection devices using a digital micro-mirror device. The claimed uniform illumination device 40 is capable of being used in any device requiring uniform light.

In contrast to the prior art uniform illumination device 10, in the uniform illumination device 40 according to the present invention, the second dispersing lenses 78 and the second condensing lens 84 are concave lenses that are used to alter the optic paths of the beams. Consequently, both the optic path and the beam size are shortened, and the condensed beams have a uniform power distribution for projection onto the screen 44. The claimed uniform illumination device 40 improves the display quality, reduces the device size, and reduces costs.

Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A uniform illumination optical device for providing uniform illumination of light produced from a light source, the uniform illumination optical device comprising:
   a beam splitting device for converting the light from the light source into a plurality of parallel beams; and
   a beam condenser for condensing the parallel beams to form a more uniform condensed light than the light from the light source, the beam condenser comprising:
      a first condensing lens which is a convex lens installed behind the beam splitting device for receiving the parallel beams from the beam splitting device; and
      a second condensing lens which is a concave lens installed behind the first condensing lens and located inside a focus of the first condensing lens for receiving beams transmitted from the first condensing lens, an optic axis of the first condensing lens coincident with an optic axis of the second condensing lens to form a central axis;
      wherein when the parallel beams transmitted from the beam splitting device pass through the first condensing lens of the beam condenser, the parallel beams converge towards the central axis, and when the parallel beams pass through the second condensing lens, the parallel beams deviate towards axes that are parallel with the central axis, the parallel beams transmitted from the beam splitting device through the first condensing lens and the second condensing lens mixing to form the more uniform condensed light.

2. The uniform illumination optical device of claim 1 wherein the beam splitting device comprises a first lens set comprising a plurality of first dispersing lenses arranged side by side to form a first flat panel for receiving the light from the light source, each first dispersing lens capable of converting transmitted light to a beam, so that the first dispersing lenses convert the light from the light source to the plurality of parallel beams.

3. The uniform illumination optical device of claim 2 wherein the beam splitting device further comprises a second lens set positioned between the first lens set and the first condensing lens, the second lens set comprising a plurality of second dispersing lenses that correspond to the plurality of first dispersing lenses, the second dispersing lenses arranged side by side to form a second flat panel that is parallel to the first flat panel, the second dispersing lenses being used to receive light transmitted from the first dispersing lenses.

4. The uniform illumination optical device of claim 3 wherein the central axis is perpendicular to the first and second flat panels, and passes through a center of the first lens set and through a center of the second lens set.

5. The uniform illumination optical device of claim 4 wherein the first dispersing lenses of the beam splitting device are convex lenses, the second dispersing lenses of the beam splitting device are concave lenses, the second dispersing lenses being located inside a focus of the first dispersing lenses, each of the first dispersing lenses capable of converging a received beam towards a corresponding optic axis, and each of the second dispersing lenses capable of dispersing a received beam from a corresponding optic axis.

6. The uniform illumination optical device of claim 5 wherein at least one optic axis of a second dispersing lens does not coincide with a corresponding first dispersing lens, the optic axis of the second dispersing lens deviating from the central axis so that a beam transmitted from the first dispersing lenses is directed towards the central axis.

7. The uniform illumination optical device of claim 5 wherein the first dispersing lenses are flat-convex lenses, and the second dispersing lenses are flat-concave lenses.

8. A uniform illumination optical device for providing a uniform illumination of light produced from a light source, the uniform illumination optical device comprising:
   a beam splitting device for converting the light from the light source into a plurality of parallel beams, the beam splitting device comprising:
      a first lens set comprising a plurality of first dispersing lenses that are convex lenses arranged side by side to form a first flat panel for receiving the light produced from the light source; and
      a second lens set comprising a plurality of second dispersing lenses corresponding to the first dispersing lenses, the second dispersing lenses being concave lenses arranged side by side to form a second flat panel that is parallel to the first flat panel; wherein the second dispersing lenses are located inside a focus of the corresponding first dispersing lenses;
      wherein when the light transmitted from the light source passes through the first lens set, the first dispersing lenses convert the light produced from the light source to a plurality of beams, and when the beams pass through the second lens set, each of the second dispersing lenses disperses the corresponding light transmitted from the first dispersing lenses away from an optic axis.

9. The uniform illumination optical device of claim 8 wherein a central axis is perpendicular with the first and second flat panels, and the central axis passes through a center of the first lens set and through a center of the second lens set.

10. The uniform illumination optical device of claim 9 wherein at least one optic axis of the second dispersing lenses does not coincide with a corresponding first dispersing lens, the optic axis of the second dispersing lens deviating from the central axis to make a beam transmitted from the first dispersing lenses deviate towards the central axis.

11. The uniform illumination optical device of claim 9 further comprising:
 a beam condenser for condensing the parallel beams from the beam splitting device to form a more uniform condensed light than the light from the light source, the beam condenser comprising:
  a first condensing lens installed behind the beam splitting device for receiving the parallel beams from the beam splitting device; and
  a second condensing lens installed behind the first condensing lens and located inside a focus of the first condensing lens for receiving the parallel beams transmitted from the first condensing lens; wherein an optic axis of the first condensing lens coincides with an optic axis of the second condensing lens to form the central axis;
  wherein when the parallel beams transmitted from the beam splitting device pass through the first and second condensing lenses, the beams gradually converge to form the more uniform condensed light.

12. The uniform illumination optical device of claim 11 wherein the first condensing lens is a convex lens, and the second condensing lens is a concave lens located inside a focus of the first condensing lens; wherein when the parallel beams transmitted from the beam splitting device pass through the first condensing lens, the parallel beams converge towards the central axis, and when the beams from the first condensing lens pass through the second condensing lens, the beams from the second condensing lens are directed towards an axis parallel to the central axis, the beams from the second condensing lens dispersing.

13. The uniform illumination optical device of claim 8 wherein the first dispersing lenses are flat-convex lenses, and the second dispersing lenses are flat-concave lenses.

14. A projection device with a uniform illumination optical device, the projection device comprising:
 a light source for producing light;
 a plurality of dichroic mirrors for splitting the light into respective red, green, and blue monochromatic beams;
 a plurality of reflectors for reflecting the red, green, and blue monochromatic beams;
 a beam splitter;
 a plurality of reflective liquid crystal display panels with half wave retarders for modulating the red, green, and blue monochromatic beams;
 a color cube for combining the red, green, and blue monochromatic beams to form an image beam;
 a set of projection lenses for projecting the image beam onto a screen; and
 a uniform illumination optical device comprising:
  a beam splitting device for converting the light from the light source into a plurality of parallel beams; and
  a beam condenser for condensing the parallel beams to form a more uniform condensed light than the light from the light source, the beam condenser comprising:
   a first condensing lens that is a convex lens installed behind the beam splitting device for receiving the parallel beams from the beam splitting device; and
   a second condensing lens that is a concave lens installed behind the first condensing lens and located inside a focus of the first condensing lens for receiving the parallel beams transmitted from the first condensing lens;
    wherein an optic axis of the first condensing lens coincides with an optic axis of the second condensing lens to form a central axis;
    wherein when the parallel beams transmitted from the beam splitting device pass through the first condensing lens of the beam condensing device, the parallel beams converge towards the central axis, and when the parallel beams pass through the second condensing lens, the parallel beams converge towards axes that are parallel with the central axis, and the parallel beams transmitted from the beam splitting device gradually converge to form a condensed beam through the first and second condensing lenses.

15. The projection device of claim 14 wherein the beam splitting device comprises a first lens set comprising a plurality of first dispersing lenses arranged side by side to form a first flat panel for receiving the light from the light source, the first dispersing lenses converting the light from the light source to the parallel beams.

16. The projection device of claim 15 wherein the beam splitting device further comprises a second lens set positioned between the first lens set and the first condensing lens, the second lens set comprising a plurality of second dispersing lenses that corresponds to the first dispersing lenses, the second dispersing lenses arranged side by side to form a second flat panel in parallel with the first flat panel, the second dispersing lenses being used to receive beams transmitted from a corresponding first dispersing lenses.

17. The projection device of claim 16 wherein the first dispersing lenses of the beam splitting device are convex lenses, the second dispersing lenses of the beam splitting device are concave lenses, the second dispersing lenses located inside a focus of the first dispersing lenses, each of the first dispersing lenses capable of converging a received beam toward an optic axis, and each of the second dispersing lenses capable of dispersing a received beam.

18. The projection device of claim 17 wherein at least one optic axis of the second dispersing lenses does not coincide with the corresponding first dispersing lens, and the optic axis deviates from the central axis to make a beam transmitted from the first dispersing lenses deviate towards the central axis and disperse.

* * * * *